June 19, 1928.
L. S. HALL
1,673,979
CUTTING OFF AND REAMING ATTACHMENT FOR THREADING MACHINES AND THE LIKE
Original Filed Feb. 18, 1924
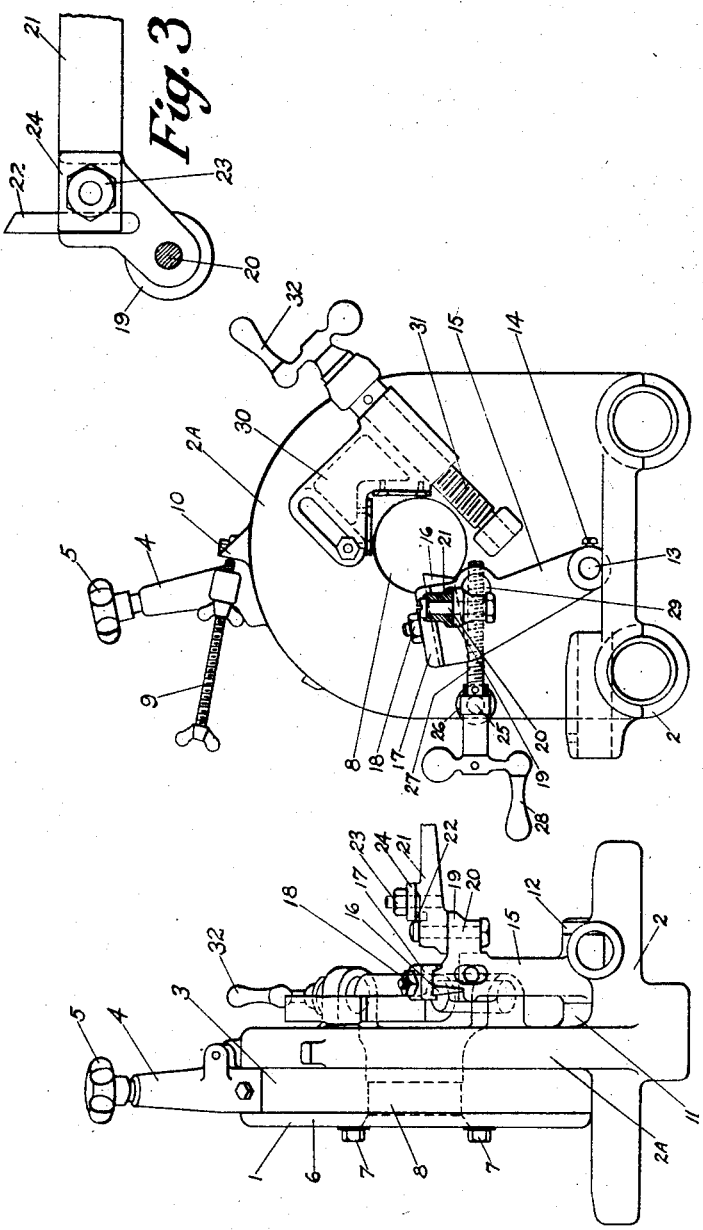
INVENTOR
LESLIE S. HALL
BY
*Philip S. Hopkins*
ATTORNEY Patented June 19, 1928.

1,673,979

UNITED STATES PATENT OFFICE.

LESLIE S. HALL, OF ERIE, PENNSYLVANIA, ASSIGNOR TO WILLIAMS TOOL CORPORATION, OF ERIE, PENNSYLVANIA.

CUTTING OFF AND REAMING ATTACHMENT FOR THREADING MACHINES AND THE LIKE.

Original application filed February 18, 1924, Serial No. 693,604. Divided and this application filed March 25, 1925. Serial No. 18,248.

My invention relates to machinery and primarily to a cutting off and reaming attachment for that type of machine known as a pipe or bolt threading machine.

The primary object of my invention lies in the provision of a simple and efficient cutting off tool, the support of which also carries a reamer.

Another object is to provide a cutting off tool and an operating mechanism therefor, which is steady and positive in operation.

A further object lies in mounting this cutting off tool upon a pivoted arm movable to and from cutting positions by a screw threaded operating member.

A still further object lies in mounting upon this pivoted support for the cutting off tool, a pivoted hand operated reaming or chamfering tool, which by virtue of its position on the cutting off arm is always within ready access to the hand of the operator.

Another object is to provide means for the ready removal and insertion of the cutting off and reaming dies or tools.

Other objects and advantages in details of construction and operation will be apparent as the description proceeds, reference being had to the accompanying drawing wherein like reference numerals indicate like parts.

This application is a division of my application, filed February 18, 1924, Serial No. 693,604.

In the drawing:

Figure 1 is a side view of a thread cutting die or head for machines of the character described, showing a side elevation of my improved cutting off and reaming device mounted thereon.

Figure 2 is a rear view of the head showing clearly the construction and operation of my improved parts.

Figure 3 is a detail view of the reaming tool and its pivoted support.

A thread cutting head or die such as that disclosed and described in my parent application above referred to, is indicated generally by the reference numeral 1. This head comprises a supporting carriage 2, whereby the head may be moved along the ways of the machine (not shown), and a rigid upstanding frame work 2$^A$. A rotatable ring 3 is journaled on this rigid support 2$^A$, and controlled by the operating arm 4, provided with the locking handle 5 to provide for the movement of the chasers or thread cutting dies (not shown) contained within the head. This mechanism is clearly shown and described in the parent application above referred to. A front plate 6 secured to the structure by bolts 7 maintains the ring 3 in operative position. These various parts of the head 1, are provided with an opening 8, shown in dotted lines in Figure 1, to receive the end of the pipe or other work to be threaded. This opening 8, as shown in Figure 2, extends completely through the head so that the pipe may be extended therethrough into operative position for engagement with the cutting off and reaming tools which are mounted on the back of the head. The set screw 9, cooperating with a lug 10, mounted integral with the top of the support 2, functions as a setting device for the ring 3.

Near the lower edge of the support 2$^A$, bearings 11 and 12 are mounted, being preferably cast directly on the supporting member. A pintle 13 is journaled in the bearings and adjustably mounted thereon, as by the set screw 14, is an arm 15, for rocking movement to and from the opening 8 whereby the cutting off tool 16 carried by said arm 15 may be brought into and out of engagement with the protruding section of pipe or work to be cut off. A clamping plate 17 held in position by the lock nut 18, secured the cutting off tool 16 in proper position.

The arm 15 is provided near its top with an outstanding bearing 19 preferably cast with the arm 15. A pintle or bolt 20 extending through this bearing forms a pivot for one end of the laterally movable arm or lever 21. This lever 21 carries a reaming or chamfering tool 22, secured in position by means of the lock bolt and nut 23 and the clamping plate 24.

It will be understood therefore that by this arrangement, the reaming or chamfering tool may be swung by hand into or out of engagement with the end of the pipe or work extending through the aperture or opening 8.

Novel means are provided for swinging the supporting arm 15 into and out of work engaging position. Pivoted at 25, near one edge of the supporting structure 2$^A$, as by means of the barrel 26, is a screw threaded shaft 27 provided at its outer end with an operating handle or wheel 28, whereby said shaft may be rotated. The inner end of the shaft 27 extends through an internally threaded rotatable barrel 29, carried by the arm 15. The barrels 26 and 29 being rotatable in suitable bearings serve to compensate for the varying distances between the pivot points 13, 25 and 29 as the arm 15 is run in or out on the pivot 13. It will be understood that rotation of the screw threaded shaft 27 through the medium of the hand wheel 28, will through the engagement of said shaft with the screw threaded barrel 29, cause such rocking movement of the arm 15 depending upon the direction of rotation of the hand wheel 28, thus bringing the cutting and reaming tools into or out of operative position.

Also mounted upon the rear of the supporting structure 20 is a V shaped steadying block 30, controlled by the screw 31 and hand wheel 32. The purpose of this element is to steady the end of the pipe for the cutting off and reaming operations and is not here described in detail inasmuch as it forms the subject matter of a separate divisional application.

The operation of my invention is as follows:—After the end of a section of pipe has been threaded in the head 1, the carriage 2 is moved along the ways of the machine a sufficient distance to permit the end of the pipe to extend through the opening 8 and protrude to the rear of the head into position where it may be engaged by the reaming and cutting off tools. If the threaded section of the pipe or other work is to be cut off, then the operator rotates the hand wheel 28 which through its screw connection 29 with the arm 15 rocks said arm forwardly so that the cutting off tool 16 engages the pipe for the cutting off operation. If the end of the pipe is to be reamed or chamfered, the operator grasps the handle 21, rocking it laterally on its pivot 20 until the tool or bit 22 engages the end of the pipe as desired. Rotation of the hand wheel 28 in the opposite direction will rock the arm 15 away from the pipe whereby said pipe may be freely withdrawn from the machine.

Although I have illustrated and described my invention as pertaining and applied to a pipe threading machine, it will be readily understood that this invention is susceptible to many and various uses in other kinds of machinery, such as bolts, cutters, lathes, etc. Furthermore, although I have shown and described the preferred embodiment of my invention, it will be understood that the same is susceptible to many changes in details of construction and operation without departing from the spirit and scope of the invention. I do not limit myself therefore to the exact structure shown and described other than by the appended claims.

I claim:

1. In combination with a die head, a substantially vertical arm pivoted thereon, means for adjusting the position of said arm, an integral bearing on said arm, a laterally extending lever pivoted in said bearing and carrying a reaming blade.

2. In combination with a die head, an arm pivoted thereon, a cutting blade in the free end thereof, a bearing on said arm, and a reamer pivotally mounted in said bearing.

3. In combination with a die head, an arm pivoted thereon, a cutting blade in the free end thereof, a bearing on said arm, and a reamer pivotally mounted in said bearing, said reamer being movable in a plane at right angles to the movement of said arm.

LESLIE S. HALL.